(12) United States Patent
Tan

(10) Patent No.: US 10,788,616 B2
(45) Date of Patent: Sep. 29, 2020

(54) BACKLIGHT MODULE, DISPLAY DEVICE AND ITS DRIVING METHOD

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/210,200

(22) Filed: Dec. 5, 2018

(65) Prior Publication Data

US 2019/0324186 A1 Oct. 24, 2019

(30) Foreign Application Priority Data

Apr. 20, 2018 (CN) .......................... 2018 1 0361987

(51) Int. Cl.
| | | |
|---|---|---|
| *F21V 8/00* | (2006.01) | |
| *G02F 1/13357* | (2006.01) | |
| *G09G 3/34* | (2006.01) | |

(52) U.S. Cl.
CPC ........... *G02B 6/0055* (2013.01); *G02B 6/002* (2013.01); *G02B 6/005* (2013.01); *G02B 6/0015* (2013.01); *G02B 6/0023* (2013.01); *G02B 6/0026* (2013.01); *G02B 6/0043* (2013.01); *G02F 1/133621* (2013.01); *G09G 3/3413* (2013.01)

(58) Field of Classification Search
CPC .......................... G02F 1/13362; G09G 3/3413; G02B 6/0043; G02B 6/005; G02B 6/055; G02B 6/0026; G02B 6/0023; G02B 6/0021; G02B 6/002; G02B 6/0015
See application file for complete search history.

(56) References Cited

U.S. PATENT DOCUMENTS

| | | | | |
|---|---|---|---|---|
| 2016/0018582 A1* | 1/2016 | Fiorentino | ........... | G02B 6/0018 362/609 |
| 2016/0147003 A1* | 5/2016 | Morozov | ............. | G02B 6/0023 359/11 |
| 2019/0302515 A1* | 10/2019 | Tan | ................... | G02F 1/133504 |

FOREIGN PATENT DOCUMENTS

| | | |
|---|---|---|
| CN | 1573462 A | 2/2005 |
| CN | 106662700 A | 5/2017 |

(Continued)

OTHER PUBLICATIONS

First Office Action for CN Appl. No. 201810361987.8, dated Mar. 26, 2020.

*Primary Examiner* — Thanh Nhan P Nguyen

(74) *Attorney, Agent, or Firm* — Dinsmore & Shohl LLP

(57) ABSTRACT

Embodiments of the present disclosure provide backlight module, display device and driving method. The backlight module comprises: light guide plate for emitting light from light-exiting surface of the light guide plate along light-exiting direction; monochromatic light sources of different colors located on a side of the light guide plate on which incident surface is located; optical path adjusting portion located on the incident surface of the light guide plate, for making light emitted by the monochromatic light sources be incident to the light guide plate from the incident surface of the light guide plate at different incident angles, wherein the light incident to the light guide plate is propagated with a total reflection; and light extracting gratings arranged in an array, located on the light-exiting surface of the light guide plate, for extracting the light with same preset angle.

15 Claims, 11 Drawing Sheets

(56) References Cited

FOREIGN PATENT DOCUMENTS

| CN | 107817629 A | 3/2018 |
|----|-------------|--------|
| CN | 108319070 A | 7/2018 |

* cited by examiner

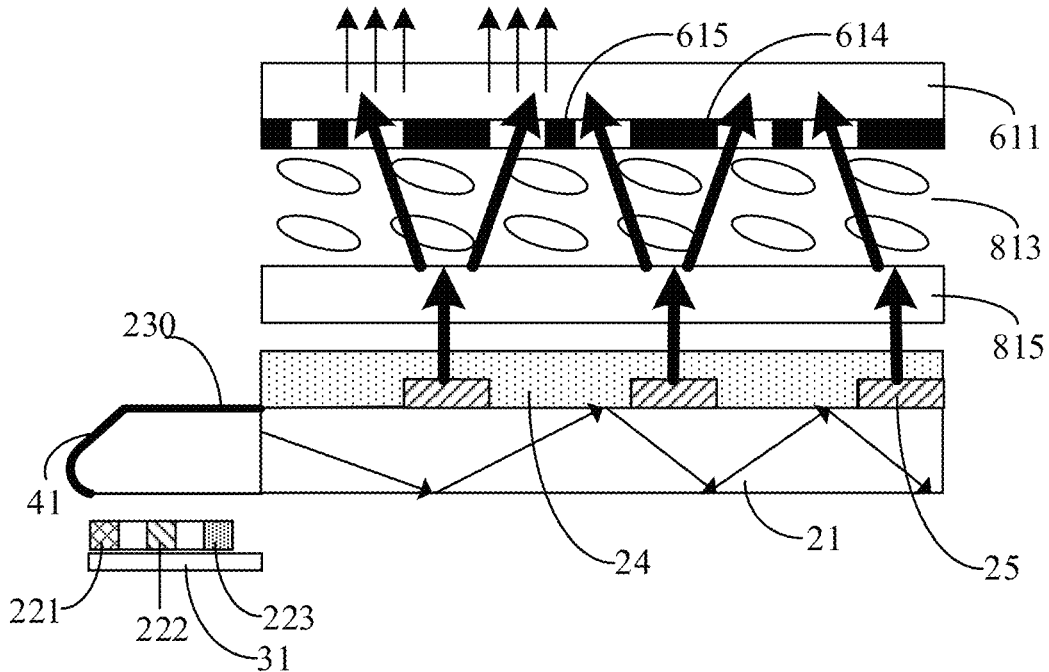

FIG. 12b

| | |
|---|---|
| When the display device is in a dark state display, during display time of one frame, controlling, by a drive circuit of a display panel, the adjustable grating structure not to adjust a propagation direction of the light emitted by the backlight module, wherein the control circuit of the backlight module outputs a backlight signal to at least one of the monochromatic light sources of a plurality of different colors | S1401 |
| When the display device is in a grayscale display, during the display time of one frame, controlling, by the drive circuit of the display panel, the adjustable grating structure to adjust the propagation direction of the light emitted by the backlight module, so that the light can be transmitted from the light transmitting region comprised in each of the pixel units, wherein the control circuit of the backlight module outputs a backlight signal to at least one of the monochromatic light sources of a plurality of different colors | S1402 |

FIG. 13

BACKLIGHT MODULE, DISPLAY DEVICE AND ITS DRIVING METHOD

CROSS-REFERENCE TO RELATED APPLICATIONS

This application claims the priority to Chinese Patent Application No. 201810361987.8 filed on Apr. 20, 2018, the entirety of which is hereby incorporated by reference as a part of this application.

TECHNICAL FIELD

The present disclosure relates to a backlight module, a display device and its driving method.

BACKGROUND

A backlight module can provide a light source for a liquid crystal display (LCD), and the backlight module mainly comprises a light source, a light guide plate, an optical film, a light uniformity film layer. The backlight module has characteristics such as high brightness, long lifetime and uniform luminescence.

A traditional LCD display technology generally uses a lower-side polarizer for polarizing the light emitted by the backlight module, the light is then modulated through a liquid crystal layer, and the modulated light produces a color through a color filter and is finally incident to an upper-side polarizer for polarization detection, so as to achieve the basic display function.

SUMMARY

The present disclosure provides a backlight module comprising:

a light guide plate for emitting light from an light-exiting surface of the light guide plate along an light-exiting direction;

monochromatic light sources of a plurality of different colors located on a side of the light guide plate on which an incident surface is located;

an optical path adjusting portion located on the incident surface of the light guide plate, for making light emitted by the monochromatic light sources of each color be incident to the light guide plate from the incident surface of the light guide plate at different incident angles, wherein the light incident to the light guide plate is propagated with a total reflection in the light guide plate; and a plurality of light extracting gratings arranged in an array, located on the light-exiting surface of the light guide plate, for extracting the light in the light guide plate with a same preset angle.

The present disclosure further provides a display device comprising the backlight module; and a display panel located on the light-exiting surface of the backlight module, wherein the display panel comprises: a substrate located above the backlight module and an adjustable grating structure located between the substrate and the backlight module; wherein the adjustable grating structure is used for adjusting a propagation direction of the light emitted by the backlight module;

the substrate comprises a plurality of pixel units arranged in an array, each comprising a light transmitting region and a light shading region;

a first shading layer is arranged in the light shading region, and an orthographical projection of the first shading layer on the substrate completely covers an orthographical projection of the light extracting grating on the substrate.

The present disclosure further provides a method of driving the display device, comprising:

when the display device is in a dark state display, during display time of one frame, controlling, by a drive circuit of the display panel, the adjustable grating structure not to adjust a propagation direction of the light emitted by the backlight module, wherein a control circuit of the backlight module outputs a backlight signal to at least one of the monochromatic light sources of the plurality of different colors;

when the display device is in a grayscale display, during the display time of one frame, controlling, by the drive circuit of the display panel, the adjustable grating structure to adjust the propagation direction of the light emitted by the backlight module, so that the light can be transmitted through the light transmitting region comprised in each of the pixel units, wherein the control circuit of the backlight module outputs a backlight signal to at least one of the monochromatic light sources of the plurality of different colors.

Various aspects of the present disclosure and advantages thereof will be given in the following description, will become apparent from the following description or will be understood through the practice of the present disclosure.

BRIEF DESCRIPTION OF THE DRAWINGS

Various aspects of the present disclosure and advantages thereof will become apparent and easily understood from the following description of the embodiments with reference to the accompanying drawings.

FIG. 8b is a timing diagram showing a drive signal of FIG. 8a;

FIG. 9b is a timing diagram showing a drive signal of FIG. 9a;

FIG. 10b is a timing diagram showing a drive signal of FIG. 10a;

FIG. 11b is a timing diagram showing a drive signal of FIG. 11a;

FIG. 12b is a schematic diagram showing light emission in a grayscale display of a display device according to the embodiments of the present disclosure;

FIG. 13 is a flowchart showing a method of driving a display device provided according to the embodiments of the present disclosure.

DETAILED DESCRIPTION

Figure 1:
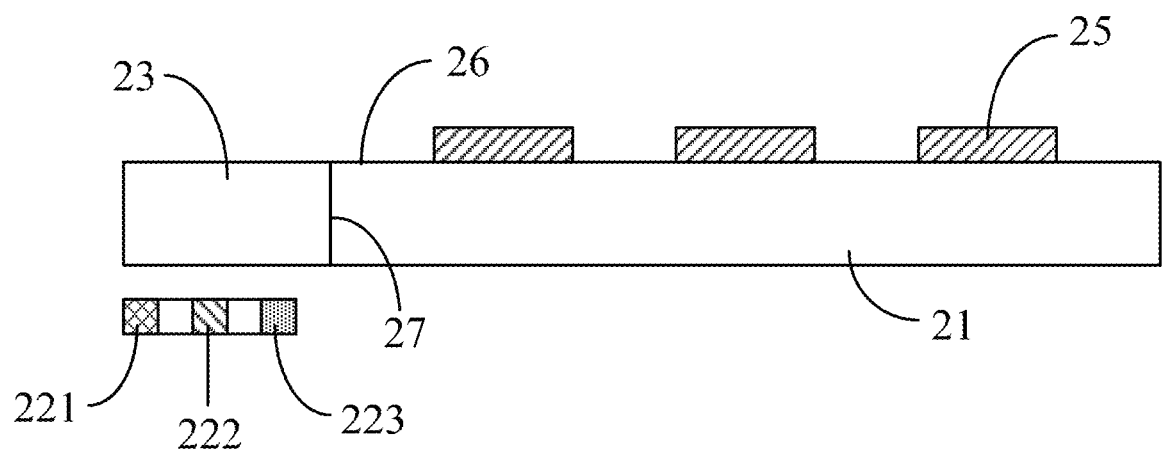
FIG. 1 is a schematic diagram showing a structure of a backlight module provided according to the embodiments of the present disclosure.

The embodiments of the present disclosure will be described in detail in the following, and examples of the embodiments are shown in the accompanying drawings, wherein the same or similar reference numerals denote the same or similar elements or elements with the same or similar functions throughout the present disclosure. The following embodiments described with reference to the accompanying drawings are merely illustrative, only serve to explain the present disclosure, and are in no way intended to limit the present disclosure.

Those skilled in the art would understand that, unless otherwise stated, the singular forms "a", "one", "said" and "that" used herein may also include plural forms. It should be further understood that, the wording "comprise" used in the specification of the present disclosure means the existence of the features, integers, steps, operations, elements, and/or components, but does not preclude the existence or addition of one or more other features, integers, steps, operations, elements, components, and/or their groups. It should be understood that when we say that an element is "connected" or "coupled" to another element, it can be directly connected or coupled to other elements, or there may exist intermediate elements. In addition, the "connected" or "coupled" used herein can include a wireless connection or a wireless coupling. The wording "and/or" used herein includes all or any of the one or more associated listed items and a combination thereof.

Those skilled in the art would understand that, all terms (including technical terms and scientific terms) used herein have the same meanings as generally understood by one of ordinary skill in the art, unless otherwise specifically defined. It should also be understood that the terms defined in common dictionaries should be interpreted as having meanings consistent with their meanings in the context of the relevant technologies, but should not be interpreted with idealized or extremely formalized meanings, unless otherwise expressly defined herein.

The technical solutions in the embodiments of the present disclosure will be described in the following with reference to the accompanying drawings.

As shown in FIG. 1, FIG. 1 is a schematic diagram showing a structure of a backlight module provided according to the embodiments of the present disclosure, comprising a light guide plate 21, monochromatic light sources of a plurality of different colors (such as a red light source 223, a green light source 222 and a blue light source 221 in the figure), an optical path adjusting portion 23, and a plurality of light extracting gratings 25 arranged in an array.

The light guide plate 21 is used for emitting light from an light-exiting surface 26 along an light-exiting direction. The monochromatic light sources 221, 222 and 223 of a plurality of different colors are located on a side of the light guide plate 21 on which the incident surface 27 is located. According to several embodiments of the present disclosure, the monochromatic light sources of a plurality of different colors comprises at least three monochromatic light sources for achieving full color display, for example, red light sources, green light sources, and blue light sources. The optical path adjusting portion 23 is located on the incident surface of the light guide plate 21, for making the light emitted by the monochromatic light source of each color be incident to an incident surface 27 of the light guide plate 21 into the light guide plate 21 at a different incident angle, and the light incident to the light guide plate 21 is propagated with a total reflection in the light guide plate 21. The incident surface 27 of the light guide plate 21 is a side surface of the light guide plate 21. In FIG. 1, the monochromatic light source is adjacent to the optical path adjusting portion 23 above the optical path adjusting portion 23, but those skilled in the art would understand that the monochromatic light source can also be adjacent to the optical path adjusting portion 23 below the optical path adjusting portion 23. The plurality of light extracting gratings 25 arranged in an array are located on the light-exiting surface 26 of the light guide plate 21, for extracting the light in the light guide plate 21 with the same preset angle.

The backlight module provided according to the embodiments of the present disclosure comprises a light guide plate, monochromatic light sources of a plurality of different colors, an optical path adjusting portion and a plurality of light extracting gratings arranged in an array. Since the optical path adjusting portion enables the light emitted by the monochromatic light source of each color (for example, a red light source, a green light source, and a blue light source) to be incident to the light guide plate at a different incident angle, the light extracting grating can extract the light in the light guide plate with the same preset angle. Since the monochromatic light sources of different colors have different wavelengths, the embodiments of the present disclosure can make the light of different wavelengths be incident to the light guide plate at different angles, and be extracted in the position of the light extracting grating with the same preset angle. As compared with the backlight module in the relevant art that can only provide a single white light, the backlight module provided according to the embodiments of the present disclosure can provide backlight of different colors.

In addition, since the light incident to the light guide plate in the embodiments of the present disclosure is propagated with a total reflection in the light guide plate, and in the position of the light extracting grating, the light in the light guide plate is emitted at the same preset angle, the backlight module provided according to the embodiments of the present disclosure can provide different colors of emitted light in the positions corresponding to the light extracting gratings. In this way, the setting of a color filter in the display panel corresponding to the backlight module can be eliminated, and the transmittance of the display panel can be improved.

In the embodiments of the present disclosure, the light guide plate 21 is arranged in a way similarly to that of the relevant art, which is not repeated here.

Specifically, the monochromatic light sources of a plurality of different colors according to the embodiments of the present disclosure specifically comprise a number of red light source 223, a number of green light source 222 and a number of blue light source 221. The number of red light sources 223 are arranged longitudinally, and a distance between adjacent two red light sources 223 is 2 millimeters (mm) to 5 mm; the number of green light sources 222 are arranged longitudinally, and a distance between adjacent two green light sources 222 is 2 mm to 5 mm; the number of blue light sources 221 are arranged longitudinally, and a distance between adjacent two blue light sources is 2 mm to 5 mm. The longitudinal direction here refers to the extension along the incident surface of the light guide plate 21.

Specifically, in the embodiments of the present disclosure, the red light source 223, the green light source 222 and the blue light source 221 can be micro light emitting diode (Micro LED) chips formed by means of transfer printing, or can also be organic light emitting diode (OLED) chip. Micro LED is a new generation display technology, and has a higher brightness, a better luminous efficiency, and a lower power consumption than the OLED.

In one or more embodiments of the present disclosure, the size of the red light source 223, the green light source 222 and the blue light source 221 in the embodiments of the present disclosure is less than 200 microns (μm), thereby reducing the thickness of and the space occupied by the backlight module.

In addition, in an actual production process, monochromatic light sources of a plurality of different colors in the embodiments of the present disclosure can also include other colors of light sources such as yellow light source. In the embodiments of the present disclosure, it is taken as an example that the monochromatic light sources of a plurality of different colors comprise the red light source 223, the green light source 222 and the blue light source 221.

In one or more embodiments of the present disclosure, the optical path adjusting portion 23 in the embodiments of the present disclosure comprises a mirror, for making the light emitted by the monochromatic light source of each color be incident to the light guide plate at a different incident angle, the incident angle increasing with the increase of the wavelength of the monochromatic light source.

Specifically, the mirror is used for making the light emitted by the red light source 223, the green light source 222 and the blue light source 221 be incident to the light guide plate at different incident angles, the incident angle of the red light source 223 being greater than the incident angle of the green light source 222, and the incident angle of the green light source 222 being greater than the incident angle of the blue light source 221.

In one or more embodiments of the present disclosure, the distance between the monochromatic light sources and the light guide plate is in inverse proportion with the wavelength of the monochromatic light emitted by the monochromatic light sources. In other words, the monochromatic light sources in the embodiments of the present disclosure are arranged away from the light guide plate with the decrease of the wavelength, so that the light extracting grating can better extract the light in the light guide plate with the same preset angle. Specifically, as shown in FIG. 1, as compared to the green light source 222, the red light source 223 with a longer wavelength is arranged closer to the light guide plate 21, and the blue light source 221 with a shorter wavelength is arranged farther from the light guide plate 21.

In one or more embodiments of the present disclosure, the preset angle in the embodiments of the present disclosure is an angle between the propagation direction of the light and the normal of the light-exiting surface, which is in a range from 0 degree to 10 degrees. Further, the preset angle in the embodiments of the present disclosure is 0 degree, that is, in the position of the light extracting grating 25, the light in the light guide plate 21 is emitted at a collimation angle.

Figure 2:
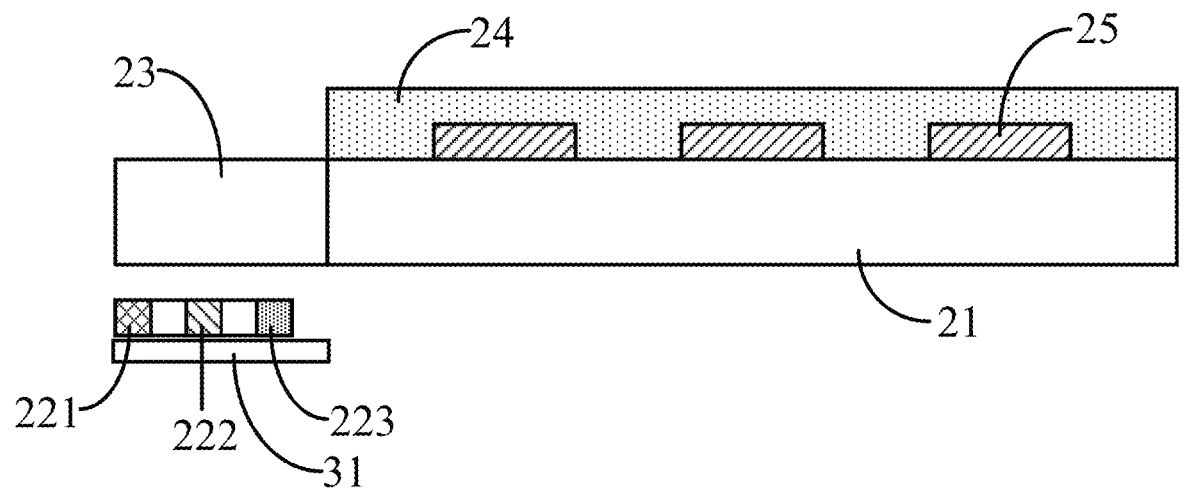
FIG. 2 is a schematic diagram showing a structure of another backlight module provided according to the embodiments of the present disclosure.

In a specific implementation, the backlight module in the embodiments of the present disclosure further comprises a reflector 31 located below the red light source 223, the green light source 222 and the blue light source 221, as shown in FIG. 2. The setting of the reflector 31 can make the light emitted downwards by the red light source 223, the green light source 222 and the blue light source 221 be reflected upwards, and then enter the optical path adjusting portion 23, thereby increasing the light efficiency.

Specifically, as shown in FIG. 2, a planarization layer 24 is arranged on the light extracting grating 25 in the embodiments of the present disclosure. The planarization layer 24 covers the light extracting grating 25, for planarizing the light extracting grating 25. In a practical design, the thickness of the planarization layer 24 can be greater than or equal to 1 μm, so as to better planarize the light extracting grating 25.

Specifically, a refractive index of the planarization layer 24 in the embodiments of the present disclosure is less than a refractive index of the light guide plate 21, and the light incident to the light guide plate 21 is totally reflected at an interface between the light guide plate 21 and the planarization layer 24. In a specific implementation, the planarization layer 24 selects a low refractive index material.

Specifically, a refractive index of the light extracting grating 25 in the embodiments of the present disclosure is greater than a refractive index of the light guide plate 21, and at an interface between the light guide plate 21 and the light extracting grating 25, the light in the light guide plate 21 is emitted at the same preset angle. In a specific implementation, the light extracting grating 25 selects a high refractive index material.

Figure 3:
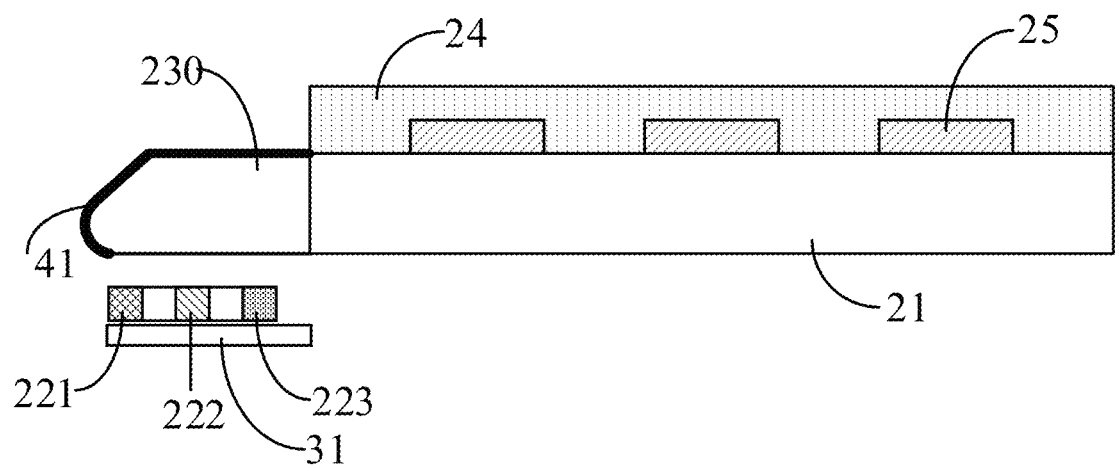
FIG. 3 is a schematic diagram showing a structure of still another backlight module provided according to the embodiments of the present disclosure.

In a specific implementation, a reflective surface (i.e., outer surface) of the mirror 230 in the embodiments of the present disclosure includes a curved portion and a planar portion, as shown in FIG. 3. The curved portion is away from the light guide plate 21, the planar portion is close to the light guide plate 21, and the planar portion is located on the same plane as the light-exiting surface of the light guide plate 21. The reflective surface of the mirror 230 is provided with a reflective metal 41, and the provision of the reflective metal 41 enables the Lambert light emitted by the red light source 223, the green light source 222 and the blue light source 221 to be gathered into the light guide plate 21 at different angles. In a practical design, the reflective surface of the mirror 230 can also be set as other shapes, and the embodiments of the present disclosure do not restrict a specific shape of the reflective surface of the mirror 230.

In a specific implementation, the refractive index of the mirror 230 in the specific embodiment of the present disclosure can be the same as that of the light guide plate 21, thereby saving the cost of material selection. In addition, when the light is incident from the mirror 230 to the light guide plate 21, the light can travel in a straight line without deflection, which helps to determine more simply the propagation direction of the light incident to the light guide plate 21.

In one or more embodiments of the present disclosure, the curved portion of the reflective surface of the mirror 230 in the embodiments of the present disclosure is parabolic. Further, as shown in FIG. 3, in order to increase the light efficiency, the highest point of the paraboloid extends a distance along a tangent to the point towards the light guide plate 21. That is, in a sectional view shown in FIG. 3, at a position of the highest point of the cross-section, after the paraboloid extends a distance along the tangent direction of paraboloid to the point towards the light guide plate 21, and then connected to the horizontal portion of the paraboloid.

In one or more embodiments of the present disclosure, a monochromatic light source of any color is arranged at a focus position of the paraboloid in the embodiments of the present disclosure. As shown in FIG. 3, the red light source 223, green light source 222, or blue light source 221 in the embodiments of the present disclosure is located in the focus position of the paraboloid, so that the Lambert light emitted by the red light source 223, or green light source 222, or blue light source 221 can be better gathered into the light guide plate 21. In the specific embodiment of the present disclosure, it is taken as an example that the green light source 222 is located in the focus position of the paraboloid. In the embodiments of the present disclosure, the red light source 223, the green light source 222, or the blue light source 221 can be located in the focus position of the paraboloid, but the order in which the red light source 223, the green light source 222 and the blue light source 223 are arranged is unchanged, that is, the red light source 223, the green light source 222 and the blue light source 223 are arranged in this order in the direction away from the incident surface of the light guide plate 21.

In one or more embodiments of the present disclosure, as shown in FIG. 3, the light extraction efficiency of the light extracting grating 25 in the embodiments of the present disclosure increases with the increase of the distance between the light extracting grating 25 and the color light source 22, and such a design can achieve the effect of light homogenization. Specifically, as shown in FIG. 3, the light extraction efficiency of the light extracting grating 25 on the left side of FIG. 3 is lower than that of the light extracting grating 25 in the middle position, and the light extraction efficiency of the light extracting grating 25 in the middle position is lower than that of the light extracting grating 25 on the right side.

In particular, the light extraction efficiency of the light extracting grating 25 can be adjusted by adjusting a duty cycle of the light extracting grating 25 and a height of the light extracting grating 25. In the specific embodiments of the present disclosure, in order to achieve a higher light extraction efficiency, the duty cycle of the light extracting grating 25 and the height of the light extracting grating 25 can be adjusted simultaneously, and the duty cycle of the light extracting grating 25 or the height of the light extracting grating 25 can be adjusted individually, and a specific adjustment mode is carried out according to actual production conditions.

In one or more embodiments of the present disclosure, the period of the light extracting grating 25 in the embodiments of the present disclosure is a preset fixed value, and the fixed value can be set according to actual requirements such as the position of the light emitted by the backlight module as actually required by the user, and the location of the display area in the display panel of the backlight module as the light source.

The following is a discussion of the principle of the embodiments of the present disclosure, according to which the light incident to the light guide plate at different angles can be emitted at the same collimation angle at the position of the light extracting grating.

In the embodiments of the present disclosure, the positions of the red (R) light source 223, the green (G) light source 222 and the blue (B) light source 221 can be determined according to the grating equation.

Theoretically, the diffraction angle θ of mth-order diffraction wave of the grating is determined only by the grating period P, the wavelength of the incident wave λ, and the incident angle γ, where γ' is the light-emitting angle after the diffraction, and the grating equation is as follows:

$$\sin \gamma - \sin \gamma' = m \lambda/P (m=0,\pm 1,\pm 2, \ldots) \qquad (1)$$

In the embodiments of the present disclosure, if, at the position of the light extracting grating 25, the light in the light guide plate 21 is emitted at the collimation angle, the light-emitting angle γ' after the diffraction is equal to zero, and the above grating equation (1) becomes:

$$\sin \gamma = m \lambda/P (m=0,\pm 1,\pm 2, \ldots) \qquad (2)$$

Since the period of the light extracting grating 25 in the embodiments of the present disclosure is a preset fixed value, m in the grating equation (2) generally takes ±1, ±2, and the wavelengths of the light emitted by the R light source 223, the G light source 222 and the B light source 221 are different, as can be learned from the grating equation (2), the incident angles γ of the light emitted by the R light source 223, the G light source 222 and the B light source 221 to the light guide plate 21 are different from each other, in order to get the effect of emitting three-color light in a collimated manner.

The inventor of the present disclosure found that, in the configuration according to the embodiment of the present disclosure, the incident angle γ of the light emitted by the R light source 223, the G light source 222 and the B light source 221 respectively to the light guide plate 21 is determined by the position relationship between the R light source 223, the G light source 222, and the B light source 221 and the mirror 230.

Specifically, as shown in FIG. 3, in the embodiment of the present disclosure, the G light source 222 is arranged in the focus position of the paraboloid, the R light source 223 is arranged on the right side of the G light source 222 and in a position away from the G light source 222 by 200 μm, and the B light source 221 is arranged on the left side of the G light source 222 and in a position away from the G light source 222 by 200 μm.

Figure 4A:
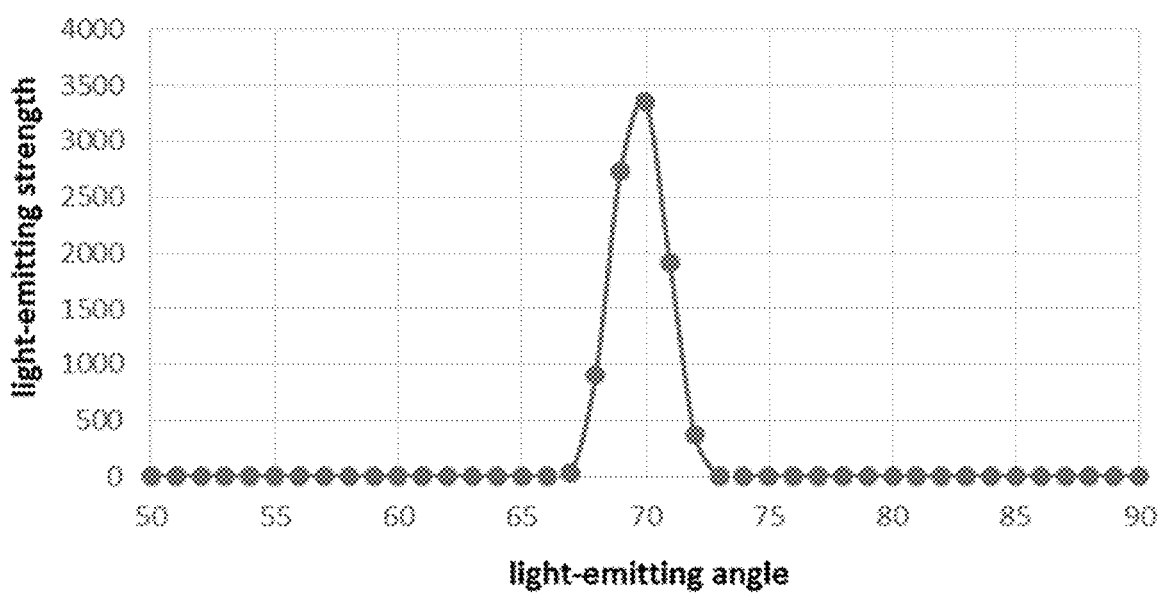
FIG. 4a is a curve graph showing simulation results of an light-emitting angle and an light-emitting strength of a red light source provided according to the embodiments of the present disclosure.
Figure 4B:
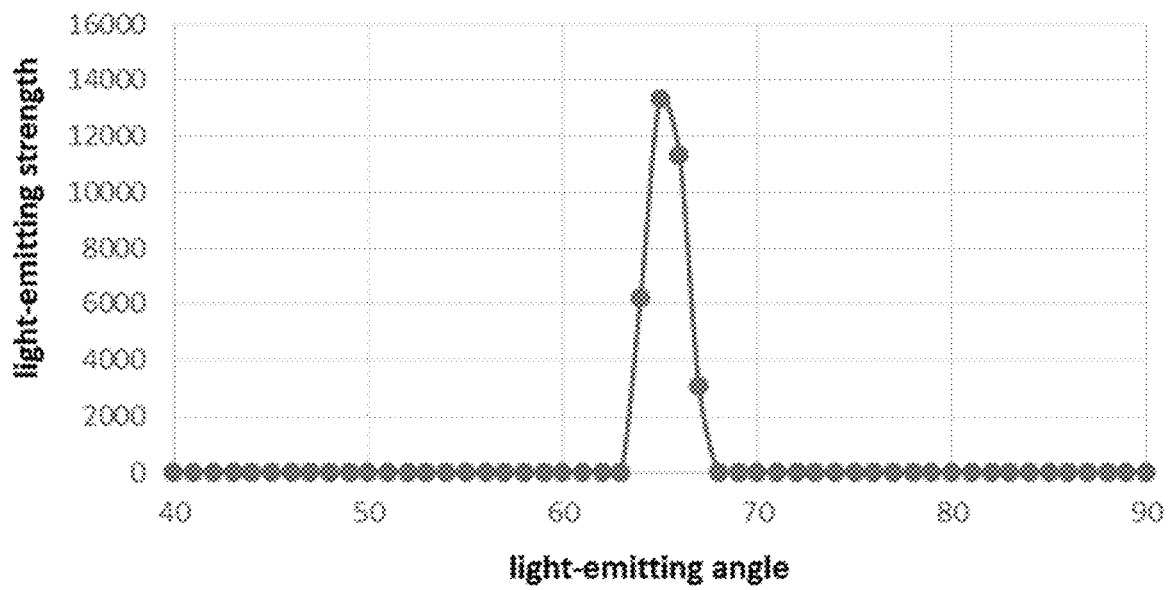
FIG. 4b is a curve graph showing simulation results of an light-emitting angle and an light-emitting strength of a green light source provided according to the embodiments of the present disclosure.
Figure 4C:
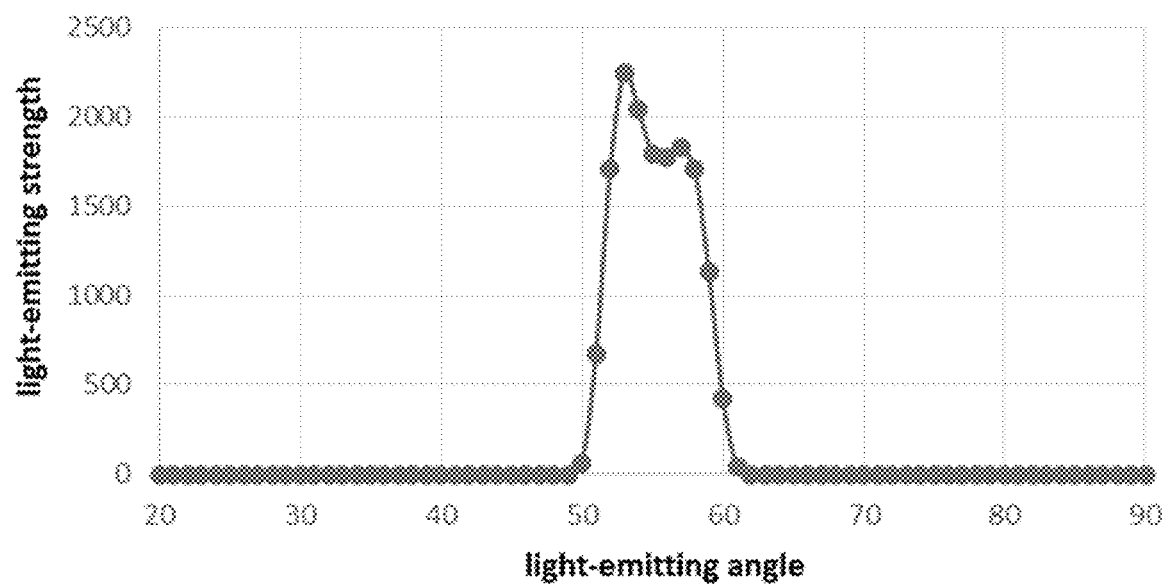
FIG. 4c is a curve graph showing simulation results of an light-emitting angle and an light-emitting strength of a blue light source provided according to the embodiments of the present disclosure.

In order to better prove that the incident angles γ of the light emitted by the R light source 223, the G light source 222 and the B light source 221 respectively to the light guide plate 21 are determined by the position relationship between the R light source 223, the G light source 222, and the B light source 221 and the mirror 230, the light-emitting angle and the light-emitting strength of the R light source 223 shown in FIG. 3 are simulated, and the simulation results are shown in FIG. 4a. In addition, the light-emitting angle and the light-emitting strength of the G light source 222 are simulated, and the simulation results are shown in FIG. 4b. In addition, the light-emitting angle and the light-emitting strength of the B light source 221 are simulated, and the simulation results are shown in FIG. 4c.

As shown in FIG. 4a, the incident angle γ of the light from the R light source 223 to the light guide plate 21 is about 70 degrees. As shown in FIG. 4b, the incident angle γ of the light from the G light source 222 to the light guide plate 21 is about 65 degrees. As shown in FIG. 4c, the incident angle γ of the light from the B light source 221 to the light guide plate 21 is about 55 degrees. As can be seen from FIG. 4a, FIG. 4b, and FIG. 4c, by adjusting the positions of the R light source 223, the G light source 222 and the B light source 221, we can adjust the angle of the light reflected by the mirror 230. The specific positions of the R light Source 223, the G light source 222 and the B light source 221 are not restricted to the positions shown in FIG. 3, and can be set according to actual situations.

In a specific implementation, among the light sources of the three colors, since the red band has the largest wavelength, by adjusting the positions of R light source 223 and mirror 230, the incident angle γ of the light emitted by the R light source 223 to the light guide plate 21 is the largest. In addition, the blue band has the smallest wavelength, so by adjusting the positions of the B light source 221 and the mirror 230, the incident angle γ of the light emitted by the B light source 221 to the light guide plate 21 is the smallest. As can be learned from the above, the embodiments of the present disclosure can make the light of various wavelengths be emitted at the collimation angle in the position corresponding to the light extracting grating 25, so that the setting of a color filter in the display panel corresponding to the backlight module can be eliminated, so as to improve transmittance of the display panel.

Figure 5:
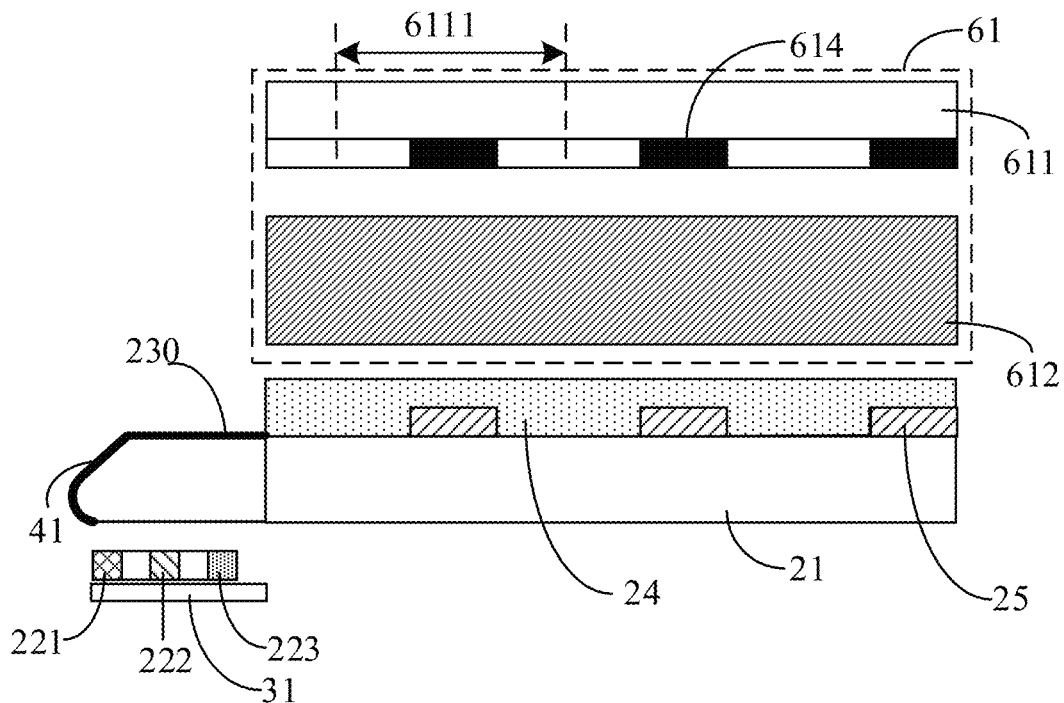
FIG. 5 is a schematic diagram showing a structure of a display device provided according to the embodiments of the present disclosure.

Based on the same concept, the embodiments of the present disclosure further provide a display device. As shown in FIG. 5, the display device comprises the backlight module provided according to the embodiments of the present disclosure and a display panel 61 located on the light-exiting surface of the backlight module. The display panel 61 comprises: a substrate 611 located above the backlight module and an adjustable grating structure 612 located between the substrate 611 and the backlight module. The adjustable grating structure 612 is used for adjusting a propagation direction of the light emitted by the backlight module. The substrate comprises a plurality of pixel units 6111 arranged in an array, each comprising a light transmitting region and a light shading region. A first shading layer 614 is arranged in the light shading region, and an orthographical projection of the first shading layer 614 on the substrate 611 completely covers an orthographical projection of the light extracting grating 25 on the substrate 611.

In the display device provided according to the embodiments of the present disclosure, through the above configuration, when the adjustable grating structure does not adjust the propagation direction of the light emitted by the backlight module, the light emitted by the backlight module at the position of the light extracting grating is absorbed by the first shading layer, and the display device realizes a dark state. When the adjustable grating structure adjusts the propagation direction of the light emitted by the backlight module so that the light can be transmitted through the light transmitting region comprised in each pixel unit, the display device realizes a grayscale display. The display device according to the embodiments of the present disclosure eliminates the need of upper and lower polarizers, and thus can further improve the transmittance of the display panel.

In addition, since the display panel according to the embodiments of the present disclosure can eliminate the need of color filters, as compared to the relevant art, the size of each pixel unit can be reduced by one-third, thereby increasing the display resolution by three times.

In one or more embodiments of the present disclosure, at the position of the light extracting grating 25, the light in the light guide plate 21 is emitted at a collimation angle, and at this time, the orthographical projection of the first shading layer 614 on the substrate 611 completely overlaps the orthographical projection of the light extracting grating 25 on the substrate 611.

Figure 6:
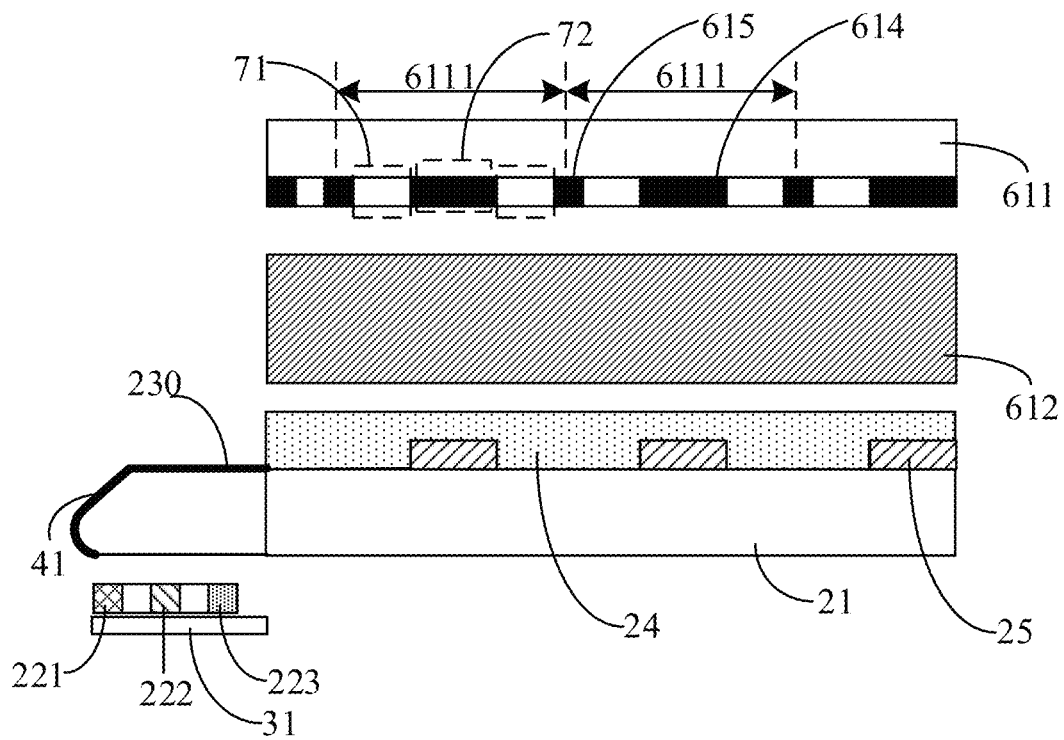
FIG. 6 is a schematic diagram showing a structure of another display device provided according to the embodiments of the present disclosure.

In a specific implementation, as shown in FIG. 6, an anti-crosstalk region is included between the adjacent two pixel units 6111, a second shading layer 615 is arranged at the corresponding position of the anti-crosstalk region, and the arrangement of the second shading layer 615 can effectively prevent the crosstalk between the adjacent pixel units 6111 in the display.

In a specific implementation, the first shading layer 614 and the second shading layer 615 are located on a side of the substrate 611 facing the adjustable grating structure 612.

In one or more embodiments of the present disclosure, the first shading layer 614 and the second shading layer 615 in the embodiments of the present disclosure select the same material, and the first shading layer 614 and the second shading layer 615 can be fabricated simultaneously using the same one pattering process. In this way, the cost of material selection can be saved and the production cost can be reduced.

In one or more embodiments of the present disclosure, as shown in FIG. 6, the light transmitting region 71 included in each pixel unit 6111 in the embodiments of the present disclosure is located around the shading region 72 included in the pixel unit 6111, and is arranged in a symmetrical distribution with respect to the central symmetrical axis of the pixel unit 6111. In this way, in an actual design, the space can be utilized to the utmost extent, and the light emission is more evenly.

Figure 7:
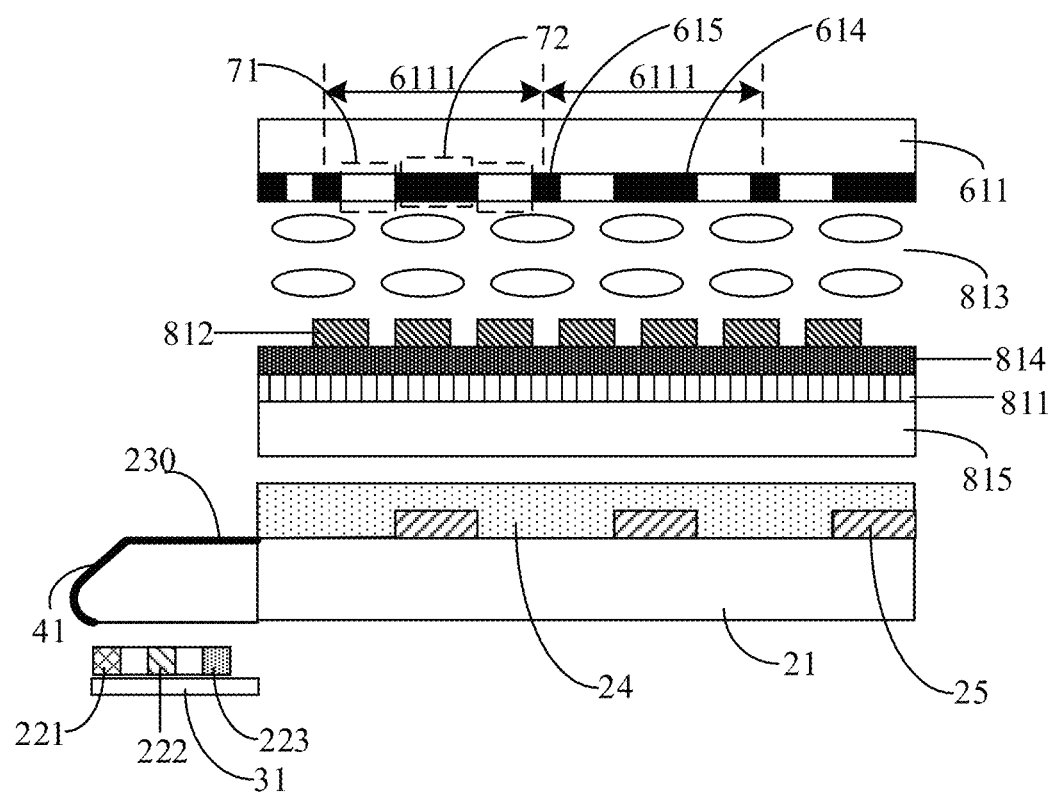
FIG. 7 is a schematic diagram showing a structure of still another display device provided according to the embodiments of the present disclosure.

In a specific implementation, as shown in FIG. 7, the adjustable grating structure 612 in the embodiments of the present disclosure includes a first electrode 811, a second electrode 812 and a liquid crystal layer 813. The liquid crystal layer 813 is located between the substrate 611 and the backlight module. The first electrode 811 and the second electrode 812 are used for driving liquid crystal molecules in the liquid crystal layer 813 to be deflected, to adjust the refractive index of the liquid crystal layer 813.

Specifically, the liquid crystal molecules in the liquid crystal layer 813 in the embodiments of the present disclosure can select nematic liquid crystal, or other types of liquid crystal. The thickness of the liquid crystal layer 813 can be 0.1 μm to 10 μm, for forming a liquid crystal grating. The specific setting of the liquid crystal layer 813 is similar to the relevant art, and thus is not repeated here.

Specifically, the display panel in the embodiments of the present disclosure further comprises a first substrate 815 that is arranged opposite to the substrate 611. The liquid crystal layer 813 is specifically arranged between the substrate 611 and the first substrate 815. The first electrode 811 can be a common electrode or pixel electrode, and the second electrode 812 can be a pixel electrode or a common electrode. In a specific embodiment of the present disclosure, at least one of the common electrode and the pixel electrode is located on the substrate 611, or, at least one of the common electrode and the pixel electrode is located on the first substrate 815. In the specific embodiment of the present disclosure, it is taken as an example that both the common electrode and the pixel electrode are located on the first substrate 815. As shown in FIG. 7, 814 in the figure represents an insulating layer.

Further, in order to reduce the thickness of the whole display device to achieve light-weight of the display device, in the embodiments of the present disclosure, the first substrate 815 can be eliminated, and the light guide plate 21 is further used as the first substrate 815 of the display panel, that is, the first substrate 815 and light guide plate 21 at this time are the same structure.

Specifically, the display panel in the embodiments of the present disclosure further comprises structures such as an orientation layer, a thin film transistor, and since these components do not involve the improvements of the present disclosure, they are no longer shown in the drawings of the disclosure, and specific settings of these components are similar to those in the relevant art and thus are not repeated herein.

The implementation of display colorization according to the embodiments of the present disclosure is discussed below.

In the embodiments of the present disclosure, it is taken as an example that the adjustable grating structure is used as the liquid crystal grating, and it is taken as an example that the light is emitted by the backlight module at the collimation angle at the position of the light extracting grating.

Figure 8A:
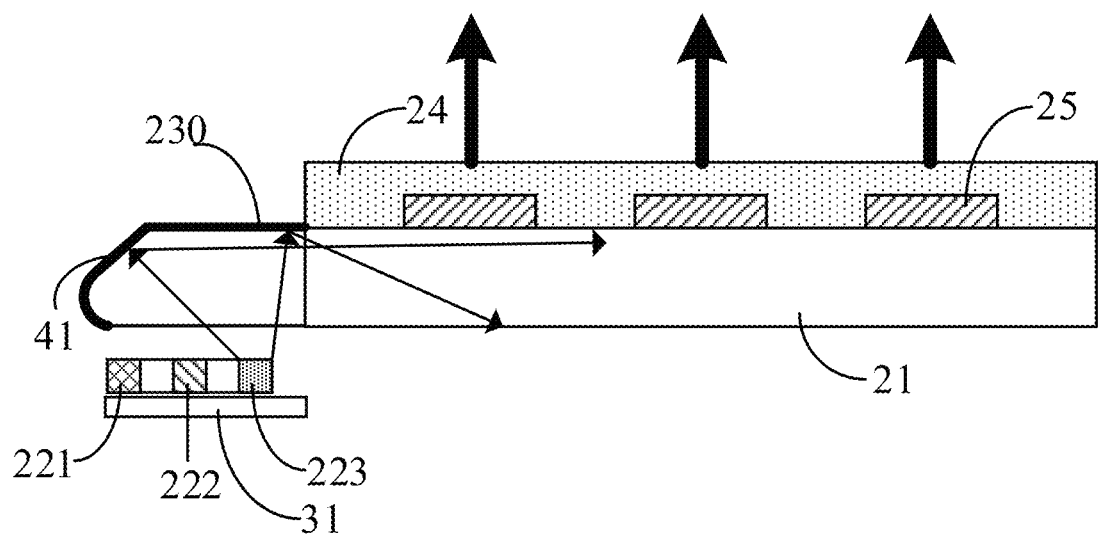
FIG. 8a is a schematic diagram showing light emission of the backlight module when the display device according to some embodiments of the present disclosure needs to display red.
Figure 8B:
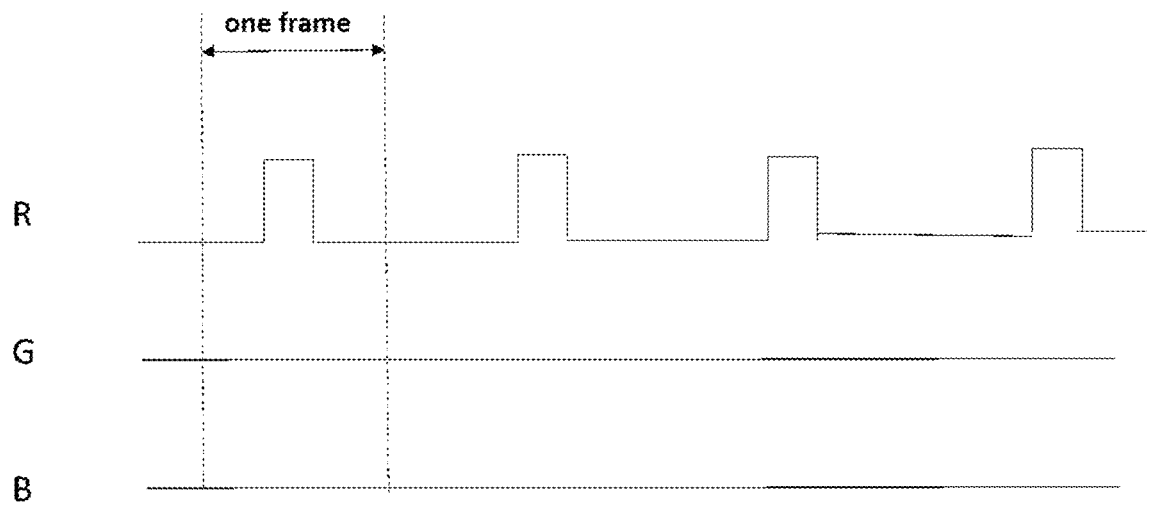

When the display panel 61 in the embodiments of the present disclosure needs to display red, during the display time of one frame, the control circuit of the backlight module outputs a backlight signal to the R light source 223, and does not output the backlight signal to the G light source 222 and the B light source 221. At this time, only the R light source 223 is all lit. As shown in FIG. 8a and FIG. 8b, at this time the display grayscale is controlled by the liquid crystal layer 813, and the arrow direction in the figure indicates the propagation direction of the light.

Figure 9A:
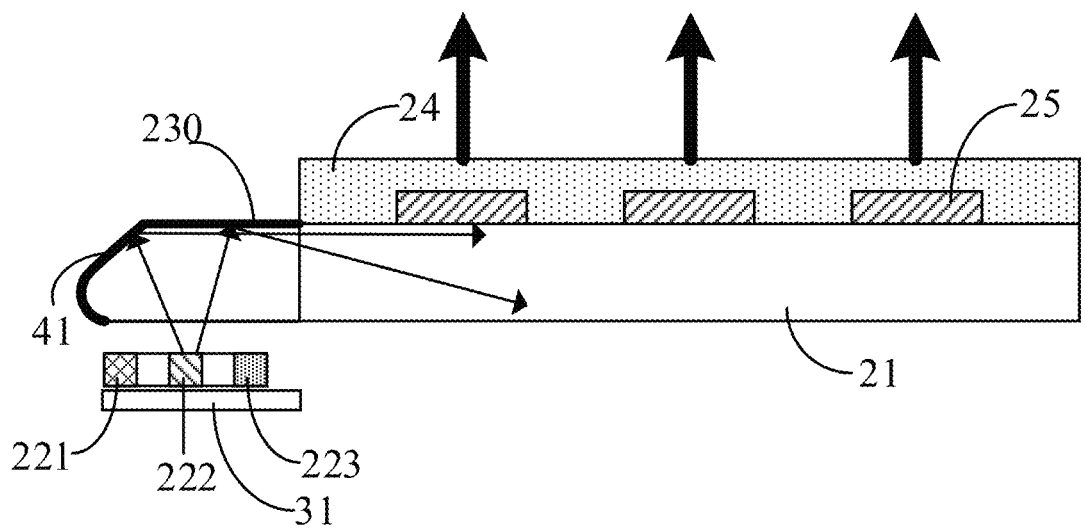
FIG. 9a is a schematic diagram showing light emission of the backlight module when the display device according to some embodiments of the present disclosure needs to display green.
Figure 9B:
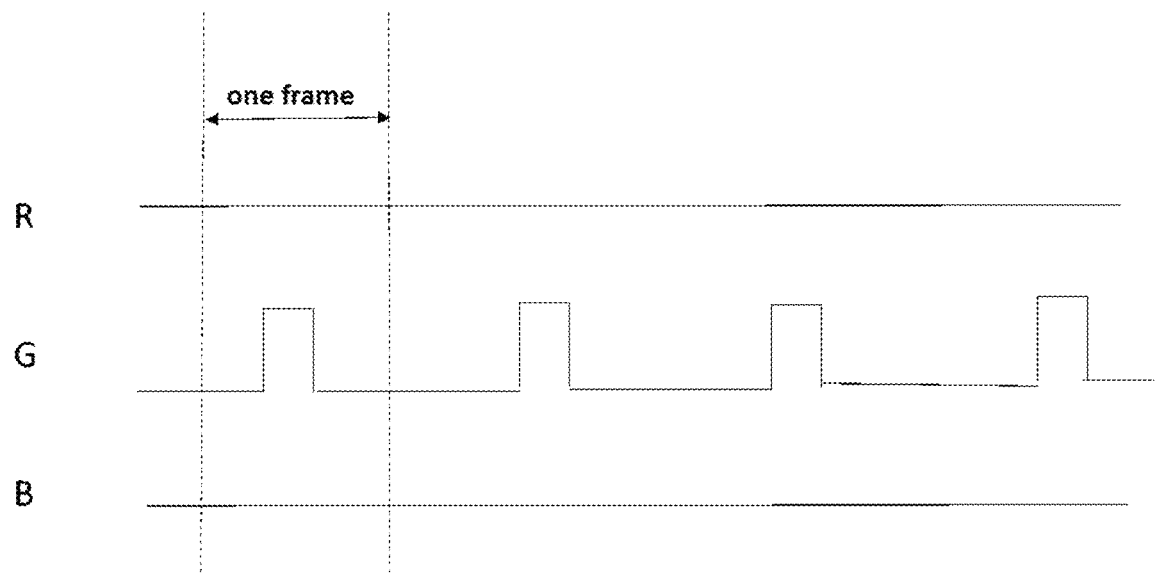

When the display panel 61 in the embodiments of the present disclosure needs to show green, during the display time of one frame, the control circuit of the backlight module outputs the backlight signal to the G light source 222, and does not output the backlight signal to the R light source 223 and the B light source 221. At this time, only the G light source 222 is all lit. As shown in FIG. 9a and FIG. 9b, at this time the display grayscale is controlled by the liquid crystal layer 813, and the arrow direction in the figure indicates the propagation direction of the light.

Figure 10A:
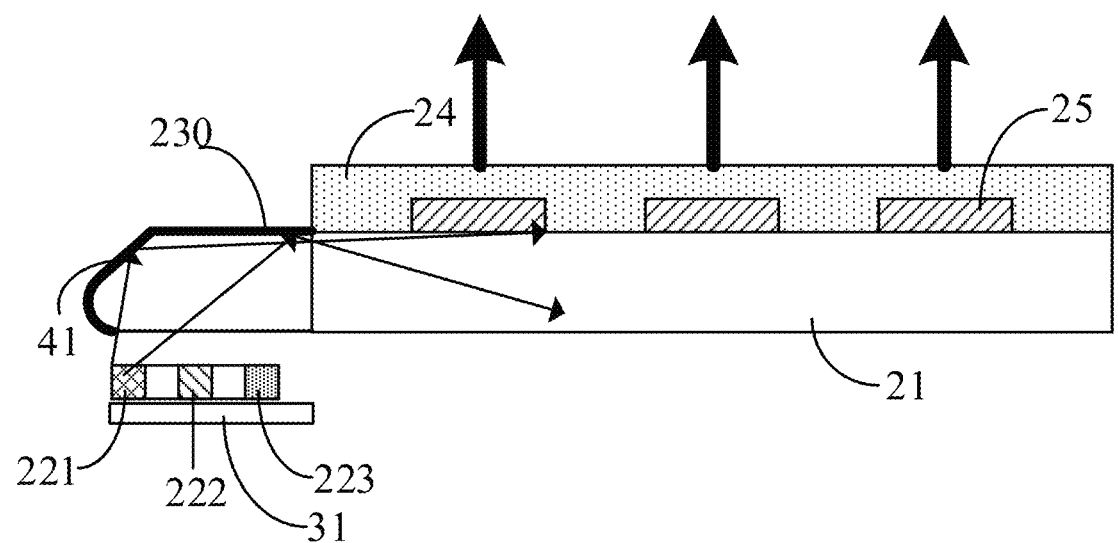
FIG. 10a is a schematic diagram showing light emission of the backlight module when the display device according to some embodiments of the present disclosure needs to display blue.
Figure 10B:
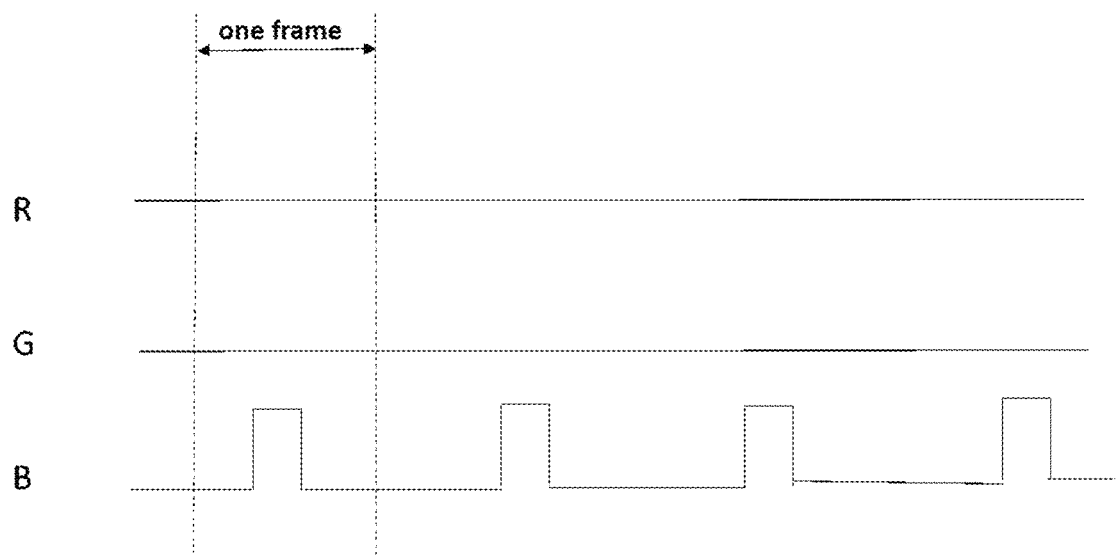

When the display panel 61 in the embodiments of the present disclosure needs to display blue, during the display time of one frame, the control circuit of the backlight module outputs the backlight signal to the B light source 221 and does not output the backlight signal to the R light source 223 and the G light source 222. At this time, only the B light source 221 is all lit. As shown in FIG. 10a and FIG. 10b, at this time the display grayscale is controlled by the liquid crystal layer 813, and the arrow direction in the figure indicates the propagation direction of the light.

Figure 11A:
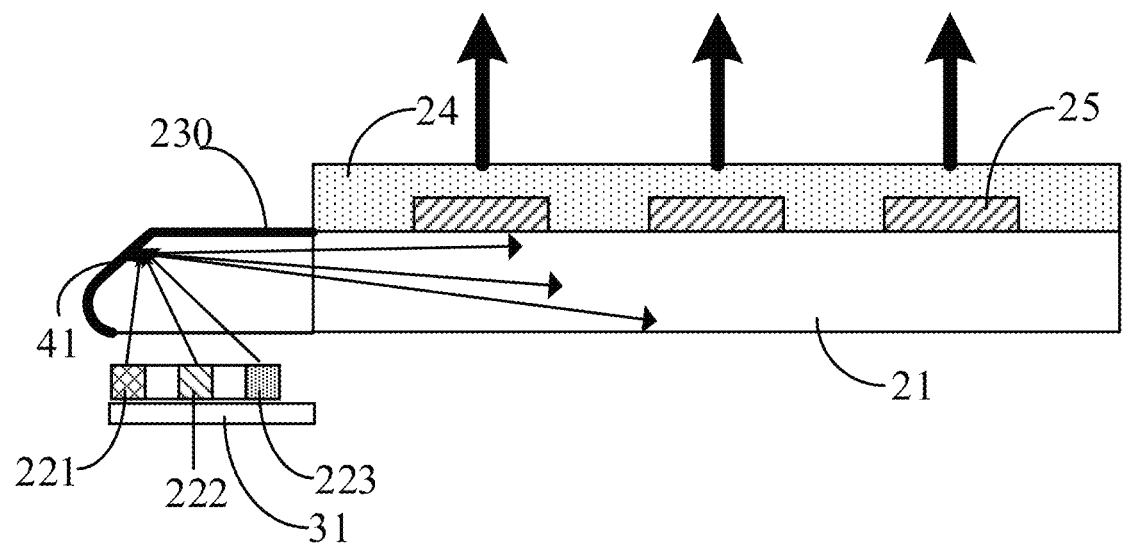
FIG. 11a is a schematic diagram showing light emission of the backlight module when the display device according to some embodiments of the present disclosure needs to display white.
Figure 11B:
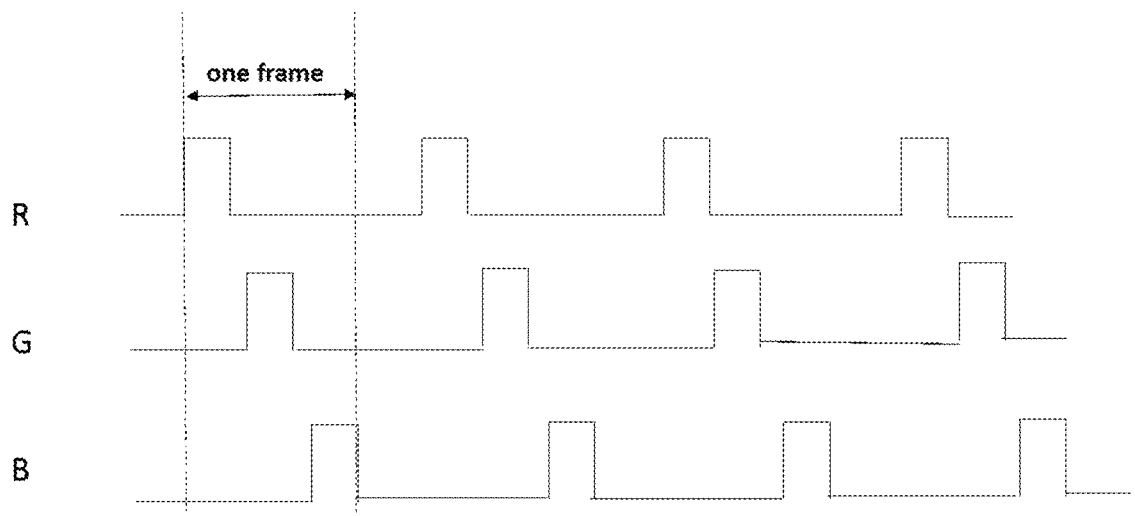

When the display panel 61 in the embodiments of the present disclosure needs to display white, during the first one-third of the display time of one frame, the control circuit of the backlight module outputs the backlight signal to the R light source 223, and during the middle one-third of the display time of one frame, the control circuit of the backlight module outputs the backlight signal to the G light source 222, and during the last one-third of the display time of one frame, the control circuit of the backlight module outputs the backlight signal to the B light source 221. At this time, the R light source 223, the G light source 222 and the B light source 221 are lit in turn. As shown in FIG. 11a and FIG. 11b, the display grayscale is controlled by the liquid crystal layer 813, and the arrow direction in the figure indicates the propagation direction of the light.

The implementation of the grayscale display according to the embodiments of the present disclosure is discussed below.

Figure 12A:
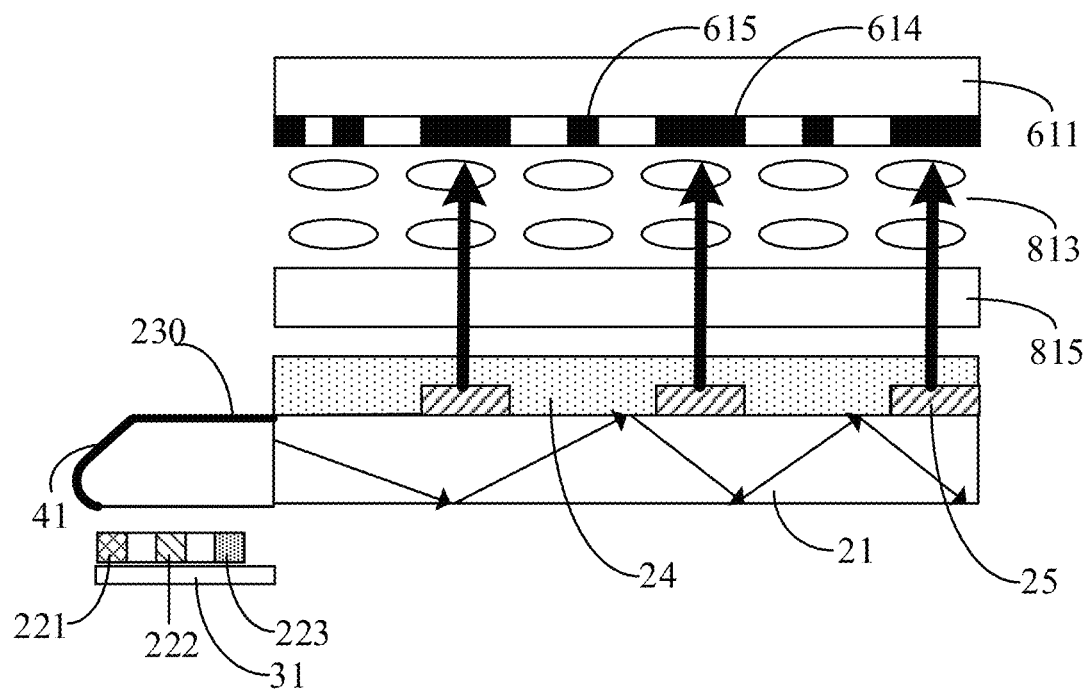
FIG. 12a is a schematic diagram showing light emission in a dark state of a display device according to the embodiments of the present disclosure.

In the embodiments of the present disclosure, during the display time of one frame, when the drive circuit of the display panel does not output a voltage signal to the liquid crystal layer 813, the light emitted by the backlight module at the collimation angle at the light extracting grating position is absorbed by the first shading layer 614, and the display device achieves a dark state (i.e., the state in which the grayscale is zero). As shown in FIG. 12a, the arrow direction in the figure indicates the propagation direction of the light.

In the embodiments of the present disclosure, during the display time of one frame, when the drive circuit of the display panel outputs a voltage signal to the liquid crystal layer 813, the liquid crystal layer 813 forms a liquid crystal grating which can break apart the light emitted by the backlight module at the collimation angle. Thereafter, the light is transmitted through the light transmitting region, and the display device realizes the grayscale display. As shown in FIG. 12b, the arrow direction in the figure indicates the propagation direction of the light. The figure only shows the light transmitted through two light transmitting regions, and three arrows in the light transmitted through the light transmitting regions indicate that the colors of the light transmitted through the light transmitting regions are red, green, and blue, respectively.

Based on the same concept, the embodiments of the present disclosure further provide a method of driving the display device, as shown in FIG. 13, comprising:

S1401: when the display device is in a dark state display, during a display time of one frame, controlling, by a drive circuit of a display panel, the adjustable grating structure not to adjust a propagation direction of the light emitted by the backlight module, wherein the control circuit of the backlight module outputs a backlight signal to at least one of the monochromatic light sources of a plurality of different colors;

S1402: when the display device is in a grayscale display, during a display time of one frame, controlling, by the drive circuit of the display panel, the adjustable grating structure to adjust the propagation direction of the light emitted by the backlight module, so that the light can be transmitted through the light transmitting region comprised in each of the pixel units, wherein the control circuit of the backlight module outputs a backlight signal to at least one of the monochromatic light sources of a plurality of different colors.

In a specific implementation, the adjustable grating structure in the embodiments of the present disclosure includes a first electrode, a second electrode, and a liquid crystal layer located between the first substrate and the backlight module, the specific structure of which is shown in FIG. 7. At this time, the drive circuit of the display panel controls the adjustable grating structure to adjust the propagation direction of the light emitted by the backlight module, which comprises:

the drive circuit outputting an electrical signal to the first electrode and the second electrode to control deflection of the liquid crystal molecules in the liquid crystal layer.

The embodiments of the present disclosure specifically adopt the following driving method.

In the driving method according to one embodiment of the present disclosure, during the display time of one frame, the drive circuit of the display panel controls the adjustable grating structure to adjust the propagation direction of the light emitted by the backlight module, so that the light can be transmitted through the light transmitting region comprised in each of the pixel units. The control circuit of the backlight module outputs a backlight signal to at least one of the monochromatic light sources of a plurality of different colors. The driving method comprises:

during the display time of one frame, the drive circuit of the display panel outputs a voltage signal with an adjustable voltage for the first electrode and/or the second electrode, and the control circuit of the backlight module outputs a backlight signal with a constant voltage for monochrome light sources of a plurality of different colors, respectively.

Figure 14:
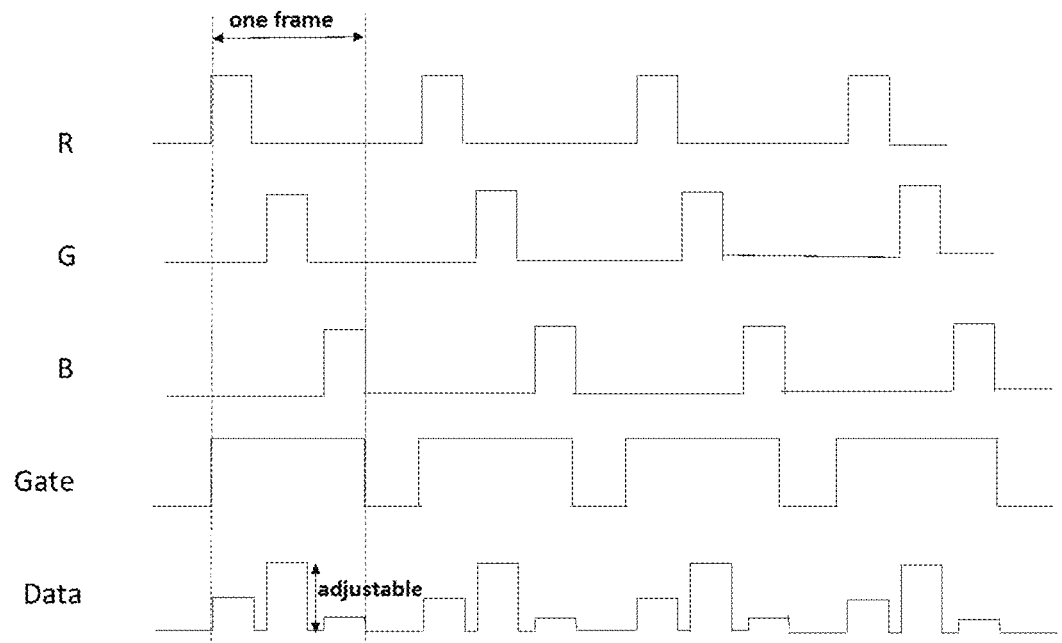
FIG. 14 is a drive signal timing diagram showing the driving using the driving method according to the embodiments of the present disclosure.

Specifically, as shown in FIG. 14, in the specific embodiment of the present disclosure, during the display time of one frame, the gate electrode drive circuit of the display panel outputs a scanning signal (such as the Gate signal in the figure) in turn for each gate line, and the source electrode drive circuit outputs a data signal(such as the Date signal in the figure) with an adjustable voltage for each data line. In the first one-third of the display time of one frame, the control circuit of the backlight module outputs a backlight signal (such as the BL R signal in the figure) with a constant voltage for the red light source; during the middle one-third of the display time of one frame, the control circuit of the backlight module outputs a backlight signal (such as the BL G signal in the figure) with a constant voltage for the green light source; and during the last one-third of the display time of one frame, the control circuit of the backlight module outputs a backlight signal (such as the BL B signal in the figure) with a constant voltage for the blue light source.

As shown in FIG. 14, the arrows in the up and down direction corresponding to the Data signal in the figure indicate that the voltage of the data signal is adjustable, and FIG. 14 shows a schematic diagram of white light display, and at this time the strength ratio of the Data signal is 3:6:1, which is better for the realization of white balance.

In the driving method according to another embodiment of the present disclosure, during the display time of one frame, the drive circuit of the display panel controls the adjustable grating structure to adjust the propagation direction of the light emitted by the backlight module, so that the light can be transmitted through the light transmitting region comprised in each of the pixel units. The control circuit of the backlight module outputs a backlight signal to at least one of the monochromatic light sources of a plurality of different colors. The driving method comprises:

during the display time of one frame, the drive circuit of the display panel outputs a voltage signal with a constant voltage to the first electrode and/or the second electrode, and the control circuit of the backlight module outputs a backlight signal with an adjustable voltage to monochrome light sources of a plurality of different colors, respectively.

Figure 15:
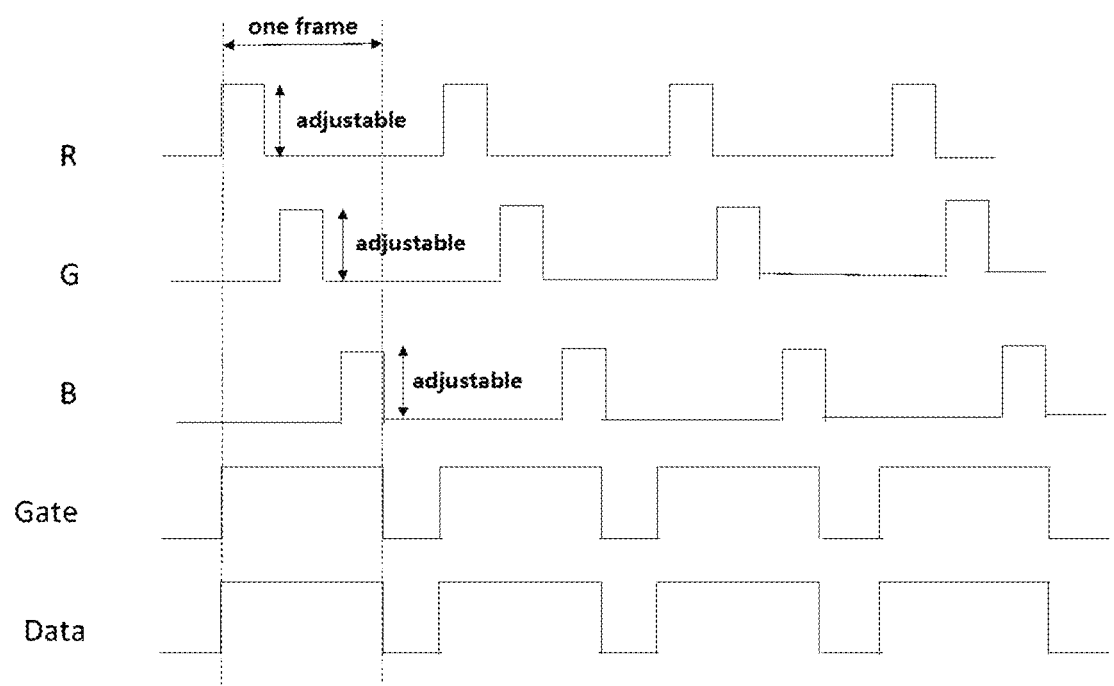
FIG. 15 is a drive signal timing diagram showing the driving using the driving method according to the embodiments of the present disclosure.

Specifically, as shown in FIG. 15, in the specific embodiment of the present disclosure, during the display time of one frame, the gate electrode drive circuit of the display panel outputs a scanning signal in turn for each gate line, and the source electrode drive circuit outputs a data signal with a constant voltage for each data line. In the first one-third of the display time of one frame, the control circuit of the backlight module outputs a backlight signal with an adjustable voltage for the red light source; during the middle one-third of the display time of one frame, the control circuit of the backlight module outputs a backlight signal with an adjustable voltage for the green light source; and during the last one-third of the display time of one frame, the control circuit of the backlight module outputs a backlight signal with an adjustable voltage for the blue light source.

As shown in FIG. 15, the arrows in the up and down direction corresponding to the BL R signal in the figure indicate that the voltage of the backlight signal received by the red light source is adjustable, the arrows in the up and down direction corresponding to the BL G signal indicate that the voltage of the backlight signal received by the green light source is adjustable, and the arrows in the up and down direction corresponding to the BL B signal indicate that the voltage of the backlight signal received by the blue light source is adjustable. By adjusting the voltage of the backlight signal, the brightness of the corresponding light source can be adjusted, and at this time, the display panel only acts as a switch.

In the driving portion of the display device, the embodiments of the present disclosure adopt the above driving method, and the backlight module can achieve light emission selected from R, G, B and W by applying different voltage signals. Thereafter, in combination with the driving of the display panel, the embodiments of the present disclosure can realize a driving mode in which the backlight module controls color information and the display panel controls grayscale information, or, a driving mode in which the backlight module controls color and grayscale information and the display panel only acts as a switch.

Only some of the embodiments of the invention are described above. It should be noted that, a person skilled in the art could make various modifications and variations without departing from the principle of the present disclosure, and all these modifications and variations shall be regarded as within the scope of protection of the invention.

What is claimed is:

1. A backlight module comprising:
    a light guide plate for emitting light from an light-exiting surface of the light guide plate along a light-exiting direction;
    monochromatic light sources of a plurality of different colors located on a side of the light guide plate on which an incident surface is located;
    an optical path adjusting portion located on the incident surface of the light guide plate, for making light emitted by the monochromatic light sources of each color be incident to the light guide plate from the incident surface of the light guide plate at different incident angles, wherein the light incident to the light guide plate is propagated with a total reflection in the light guide plate; and
    a plurality of light extracting gratings arranged in an array, located on the light-exiting surface of the light guide plate, for extracting the light in the light guide plate with a same preset angle,
    wherein the optical path adjusting portion comprises a mirror, and
    wherein the mirror is used for making the incident angle increase as a wavelength of the monochromatic light source increases.

2. The backlight module according to claim 1, wherein distances between the monochromatic light sources and the light guide plate are in inverse proportion with wavelengths of the light emitted by the monochromatic light sources.

3. The backlight module according to claim 1, wherein the preset angle is an angle between a propagation direction of the light extracted from the light guide plate and a normal of the light-exiting surface, and is in a range from 0 degree to 10 degrees.

4. The backlight module according to claim 1, wherein a reflective surface of the mirror includes a curved portion and a planar portion, wherein the planar portion is closer to the light guide plate than the curved portion, and the planar portion is located on the same plane as the light-exiting surface of the light guide plate.

5. The backlight module according to claim 4, wherein the curved portion of the reflective surface of the mirror is parabolic, and the monochromatic light source of any color is arranged at a focus position of the paraboloid.

6. The backlight module according to claim 1, wherein a light extraction efficiency of the light extracting grating increases as a distance between the light extracting grating and the monochromatic light source increases.

7. The backlight module according to claim 1, wherein the monochromatic light sources of the plurality of different colors comprises at least three monochromatic light sources for achieving full color display.

8. A display device, comprising:
a backlight module comprising:
a light guide plate for emitting light from an light-exiting surface of the light guide plate along an light-exiting direction;
monochromatic light sources of a plurality of different colors located on a side of the light guide plate on which an incident surface is located;
an optical path adjusting portion located on the incident surface of the light guide plate, for making light emitted by the monochromatic light sources of each color be incident to the light guide plate from the incident surface of the light guide plate at different incident angles, wherein the light incident to the light guide plate is propagated with a total reflection in the light guide plate; and
a plurality of light extracting gratings arranged in an array, located on the light-exiting surface of the light guide plate, for extracting the light in the light guide plate with a same preset angle; and
a display panel located on the light-exiting surface of the backlight module, wherein the display panel comprises:
a substrate located above the backlight module and an adjustable grating structure located between the substrate and the backlight module; wherein
the adjustable grating structure is used for adjusting a propagation direction of the light emitted by the backlight module;
the substrate comprises a plurality of pixel units arranged in an array, each comprising a light transmitting region and a light shading region;
a first shading layer is arranged in the light shading region, and an orthographical projection of the first shading layer on the substrate completely covers an orthographical projection of the light extracting grating on the substrate.

9. The display device according to claim 8, wherein substrate further comprises an anti-crosstalk region between adjacent pixel units, and a second shading layer is arranged in the anti-crosstalk region.

10. The display device according to claim 8, wherein the light transmitting region included in each pixel unit is located around the shading region included in the pixel unit, and is arranged in a symmetrical distribution with respect to central symmetrical axis of the pixel unit.

11. The display device according to claim 8, wherein the adjustable grating structure comprises a first electrode, a second electrode and a liquid crystal layer, the liquid crystal layer is located between the substrate and the backlight module;
the first electrode and the second electrode are used for driving liquid crystal molecules in the liquid crystal layer to be deflected, to adjust a refractive index of the liquid crystal layer.

12. The display device according to claim 8, wherein the monochromatic light sources of the plurality of different colors comprises at least three monochromatic light sources for achieving full color display.

13. A method of driving a display device, wherein the display device comprises a backlight module comprising:
a light guide plate for emitting light from an light-exiting surface of the light guide plate along an light-exiting direction;
monochromatic light sources of a plurality of different colors located on a side of the light guide plate on which an incident surface is located;
an optical path adjusting portion located on the incident surface of the light guide plate, for making light emitted by the monochromatic light sources of each color be incident to the light guide plate from the incident surface of the light guide plate at different incident angles, wherein the light incident to the light guide plate is propagated with a total reflection in the light guide plate; and
a plurality of light extracting gratings arranged in an array, located on the light-exiting surface of the light guide plate, for extracting the light in the light guide plate with a same preset angle; and
a display panel located on the light-exiting surface of the backlight module, wherein the display panel comprises:
a substrate located above the backlight module and an adjustable grating structure located between the substrate and the backlight module; wherein
the adjustable grating structure is used for adjusting a propagation direction of the light emitted by the backlight module;
the substrate comprises a plurality of pixel units arranged in an array, each comprising a light transmitting region and a light shading region;
a first shading layer is arranged in the light shading region, and an orthographical projection of the first shading layer on the substrate completely covers an orthographical projection of the light extracting grating on the substrate,
the driving method comprises:
when the display device is in a dark state display, during display time of one frame, controlling, by a drive circuit of the display panel, the adjustable grating structure not to adjust a propagation direction of the light emitted by the backlight module, wherein a control circuit of the backlight module outputs a backlight signal to at least one of the monochromatic light sources of the plurality of different colors;
when the display device is in a grayscale display, during the display time of one frame, controlling, by the drive circuit of the display panel, the adjustable grating structure to adjust the propagation direction of the light emitted by the backlight module, so that the light is able to be transmitted through the light transmitting region comprised in each of the pixel units, wherein the control circuit of the backlight module outputs the backlight signal to at least one of the monochromatic light sources of the plurality of different colors.

14. The driving method according to claim 13, wherein the adjustable grating structure comprises a first electrode, a second electrode and a liquid crystal layer located between the substrate and the backlight module;
   wherein the step in which the drive circuit of the display panel controls the adjustable grating structure to adjust the propagation direction of the light emitted by the backlight module comprises:
      the drive circuit outputting an electrical signal to the first electrode and the second electrode to control deflection of the liquid crystal molecules in the liquid crystal layer.

15. The driving method according to claim 14, wherein the step in which during the display time of one frame, the drive circuit of the display panel controls the adjustable grating structure to adjust the propagation direction of the light emitted by the backlight module, so that the light is able to be transmitted through the light transmitting region comprised in each of the pixel units, wherein the control circuit of the backlight module outputs a backlight signal to at least one of the monochromatic light sources of the plurality of different colors comprises:
   during the display time of one frame, the drive circuit of the display panel outputs a voltage signal with an adjustable voltage to the first electrode and/or the second electrode, and the control circuit of the backlight module outputs a backlight signal with a constant voltage to the monochrome light sources of the plurality of different colors, respectively; or,
   during the display time of one frame, the drive circuit of the display panel outputs a voltage signal with a constant voltage to the first electrode and/or the second electrode, and the control circuit of the backlight module outputs a backlight signal with an adjustable voltage to the monochrome light sources of the plurality of different colors, respectively.

* * * * *